United States Patent Office

3,343,914
RECOVERING STRONTIUM FROM REACTOR FUEL REPROCESSING SOLUTIONS AS STRONTIUM SULFATE
Lane A. Bray, Richland, Wash., assignor to the United States of America as represented by the United States Atomic Energy Commission
No Drawing. Filed Mar. 20, 1964, Ser. No. 353,641
3 Claims. (Cl. 23—122)

ABSTRACT OF THE DISCLOSURE

A method for recovering strontium from reactor fuel reprocessing solutions by neutralizing the solution to a pH of 0.5 to 2.0, increasing the sulfate ion content to about 1 molar, diluting the solution with water to prevent precipitation of iron and adding lead nitrate to form a precipitate of lead and strontium sulfate which may then be separated from the solution.

---

The invention relates to a novel method of recovering strontium values from solution, more particularly to the recovery of the radioactive strontium which is present in millimolar concentrations in aqueous solutions resulting from the reprocessing of nuclear reactor fuels.

Recovery of the radiostrontium which is present in nuclear fuel reprocessing solutions is desirable for two reasons; the 90 isotope has economic value as a long-lived beta source, and, more important, the remainder of the waste cannot be reduced to solid form and stored unless this is done because of the heat the isotope generates.

The problem of strontium removal is complicated by the fact that the reprocessing solutions contain a large number of other ions including not only those of other fission products, but also the much larger concentrations of dissolved structural metals such as aluminum and iron. This makes for many interference effects when chemical operations are being carried out, especially when the highly acidic solutions are being neutralized by sodium hydroxide preparatory to other steps. An undesirable and massive precipitation of iron hydroxides takes place at a surprisingly low pH under these circumstances, as low as at a pH of one. To guard against this, resort is made to organic complexing agents such as tartaric and hydroxyacetic acids which, while effective, add to the expense of reprocessing. The economic importance of this can be seen when it is recalled that waste solutions being treated are often on the order of thousands and even tens of thousands of gallons, and the cost of complexing agents to treat such volumes is extremely high.

Even when these expensive complexing agents are used, the processes now in use are not entirely satisfactory. They are slow to carry out and the amount of strontium removed averages only around 80 percent. This allows a substantial amount of strontium radioactivity to remain with the liquid waste, so that the heating problem is not fully solved.

It is, accordingly, the general object of the invention to provide a more thorough and more economical method of recovering strontium from aqueous solutions than the methods now known.

It is a more particular object to provide such a method without the use of expensive organic complexing agents to inhibit the precipitation of iron hydroxides.

Other objects will appear as the description proceeds.

The above objects are attained by my discovery that when reprocessing solutions are properly diluted they may then be neutralized with sodium carbonate, and precipitation of iron hydroxides will be suppressed to where they can do no harm, up to a pH of two. This makes it possible to carry out a strontium recovery process without the expense of organic complexing agents. I believe that this must be due to the formation of some kind of complex by the carbonate ion with the iron in the solution, and possibly with the aluminum as well. This conclusion is supported by the fact that heating the solution after adding the sodium carbonate does not, as might be expected, merely increase evolution of carbon dioxide, and by thus driving carbonate ion out of the solution, make it equivalent to one where neutralization had been made with sodium hydroxide in the first place; on the contrary, heating actually assists the over-all strontium recovery, as will be shown later. However, I do not want to be rigorously bound by this explanation of how my invention works, and it is offered empirically on the basis of results observed.

Due to the varying makeup of reprocessing waste solutions, the amount of dilution required cannot be stated simply. However, for a typical waste solution having molarities of 0.6 in $Na^+$, 0.5 in Fe(III), 0.1 in Al(III), 0.01 in Ni(II), Cr(III) and the rare earth elements (III), hereinafter abbreviated R.E. (III), 0.002 in Sr(II), 4.0 in $H^+$ and 1.0 in $SO_4^{-2}$, dilution to less than half strength suppresses the volume of precipitates of metal hydroxides, when sodium carbonate is added, to around one percent of solution volume. As will be seen in Example I below, a dilution factor of about 2.5 appears to be critical; when the solution is diluted by this factor the precipitate volume/solution volume percentage remains within the range of 1–1.5%, whereas when the dilution factor is 2.0 the same percentage may be as high as 37%, depending on the digestion time. Furthermore when the dilution factor is 2.5 or greater, digestion time becomes less important, and similar good suppression of precipitation is attained over wide ranges of digestion time.

The dilution having been made, the solution is brought within the pH range of about 0.5 to 2.0 with sodium corbonate. A slight precipitation of iron hydroxide will appear as already explained, but this will not be enough to interfere with the subsequent steps of the process.

Either before or after the neutralization, sulfate ion is added to the solution, if needed, to bring the sulfate concentration within the range of 0.7 to 1.0 molar. This is done, preferably, with $Na_2SO_4$ or $NaHSO_4$. After this addition the solution is heated, or digested, at 80° C. for fifteen minutes for optimum results. A shorter digestion time than this optimum adversely affects the separation process to a marked degree, whereas a longer digestion time does so much more gradually if not too prolonged, as will be seen later on.

Following the digestion, lead nitrate is added to make a concentration of about 0.02 molar, and within as little as one minute a precipitate forms of lead and strontium sulfates. This may then be removed from the solution by any of the well known methods such as filtration, decantation, but, preferably, by centrifugation. As a matter of fact, the precipitate forms so quickly and completely that the lead nitrate may be added continuously to a stream of solution on its way to a centrifuge, thus simplifying the process.

The foregoing represents a saving in time over the old process employing sodium hydroxide as the neutralizing agent; in that process the solution has to be digested for a full hour after the addition of lead nitrate in order to make a precipitate that can be separated. Even so, the average strontium recovery by the old process is no more than 80 percent, as compared to well over 90 percent for the process of the present invention.

Following the recovery of the precipitate, the separation process of strontium from the waste solution may be considered to be complete. Separation of lead sulfate from strontium sulfate is well known and is brought about by metathesizing them with caustic and diluting sufficiently to remove the comparatively soluble hydroxide of strontium from the sparingly soluble one of lead by filtration or other such expedient. The strontium-containing filtrate may then be neutralized with a mineral acid and further purified, if desired, by solvent extraction, ion exchange, crystallization or other purification techniques.

*Example I*

In order to establish the proper dilution, 1,000 ml. of a synthetic waste, designated 1 WW, was made up with the following molarities:

| | |
|---|---|
| $Na^+$ | 0.6 |
| $Fe(III)$ | 0.5 |
| $Al(III)$ | 0.1 |
| $Ni(II)$ | 0.01 |
| $Cr(III)$ | 0.01 |
| $Sr(II)$ | 0.002 |
| R.E. (III) | 0.01 |
| $H^+$ | 4 |
| $SO_4^{-2}$ | 1 |

To the 1,000 ml. of 1 WW was added 170 ml. of 6 M $NaHSO_4$ and 826 ml. of 3 M $Na_2CO_3$, which raised the pH of the solution to 1 and its volume to 1996 ml. Samples, ranging in size from 10 to 15 ml., were taken of the treated solution and diluted with $H_2O$ according to dilution factors ranging from 2 to 4.5, heated at 80° C. for different times, centrifuged, and the volume of the resulting solids recorded. Table I below shows, in columns from left to right, volume of the samples, final volume after dilution, dilution factors, hours heated, precipate volume, and percentage of precipitate volume to volume of the sample, as follows:

From the above it is apparent that there is a critical difference between solutions with a dilution factor of 2.5 and those with one of 2.0. Furthermore, it can be seen that when the dilution factor is 2.0, less metal hydroxide is precipitated when the digestion time of the solution is 1 hour rather than 2 hours. It will be seen that better results are achieved when the digestion time is limited to 15 minutes in the next example.

*Example II*

A volume of 1 WW synthetic waste solution of the same composition as in Example I was treated with $Na_2CO_3$ and $NaHSO_4$ in the same manner as in Example I. Samples were then taken, diluted in two different proportions and digested at various times as set out in the first four columns on the left of Table II below. $Pb(NO_3)_2$ was then added to the samples individually so that all had a lead concentration of 0.02 M, the samples were stirred for one minute, their final pH read, and the samples were centrifuged and the precipitates separated. The aqueous centrifugate was then analyzed for strontium and the percentage of strontium remaining in the aqueous, or centrifugate, out of the strontium in the samples was computed. This is set forth in the extreme right column of Table II, as follows:

TABLE II

| Vol. of treated 1 WW (ml.) | Final Vol. (ml.) | Sulfate Concn. (M) | Digestion Time, 80° C. (min.) | Lead Concn. (M) | Stirring Time after Lead Add. (min.) | Final pH | Percent of Orig. Sr in Aq. |
|---|---|---|---|---|---|---|---|
| 100 | 205 | 1.1 | 60 | 0.02 | 1 | 0.55 | 3.1 |
| 100 | 205 | 1.1 | 1 | 0.02 | 1 | 0.55 | 32 |
| 100 | 205 | 1.1 | 60 | 0.02 | 1 | 1.0 | 1.8 |
| 100 | 205 | 1.1 | 1 | 0.02 | 1 | 1.0 | 19 |
| 100 | 205 | 1.1 | 60 | 0.02 | 1 | 2.0 | 2.0 |
| 100 | 205 | 1.1 | 1 | 0.02 | 1 | 2.0 | 17 |
| 100 | 198 | 1.0 | 1 | 0.02 | 1 | 1.0 | 19 |
| 100 | 198 | 1.0 | 15 | 0.02 | 1 | 1.0 | 4.1 |
| 100 | 198 | 1.0 | 30 | 0.02 | 1 | 1.0 | 5.0 |
| 100 | 198 | 1.0 | 45 | 0.02 | 1 | 1.0 | 2.4 |
| 100 | 198 | 1.0 | 60 | 0.02 | 1 | 1.0 | 4.8 |

From the above Table II it can be seen that a digestion time of 1 minute at 80° C. is inadequate to reduce the amount of strontium in the aqueous sufficiently, that 60 minutes gives better results, but that 15 minutes gives optimum results.

*Example III*

All the steps of Example II were repeated, under the same conditions, except that the digestion time was held constant at 60 minutes and the digestion temperature

TABLE I

| Vol. of treated 1 WW (ml.) | Final Vol. (ml.) | Dilution Factor | Hours Heated, 80° C. | Ppt. Vol. (ml.) | Ppt. Vol. ×100 / Treated 1 WW Vol. Percent |
|---|---|---|---|---|---|
| 15 | 30 | 2 | 1 | 2.3 | 15 |
| 15 | 30 | 2 | 2 | 2.8 | 19 |
| 15 | 30 | 2 | 1 | 0.4 | 3 |
| 15 | 30 | 2 | 2 | 5.5 | 37 |
| 10 | 25 | 2.5 | 1 | 0.1 | 1.0 |
| 10 | 25 | 2.5 | 2 | 0.15 | 1.5 |
| 15 | 40 | 2.7 | 1 | 0.15 | 1.0 |
| 15 | 40 | 2.7 | 2 | 0.17 | 1.1 |
| 10 | 30 | 3 | 1 | 0.12 | 1.2 |
| 10 | 30 | 3 | 2 | 0.12 | 1.2 |
| 10 | 35 | 3.5 | 1 | 0.1 | 1.0 |
| 10 | 35 | 3.5 | 2 | 0.15 | 1.5 |
| 10 | 40 | 4 | 1 | 0.1 | 1 |
| 10 | 40 | 4 | 2 | 0.15 | 1.5 |
| 10 | 45 | 4.5 | 1 | 0.12 | 1.2 |
| 10 | 45 | 4.5 | 2 | 0.15 | 1.5 | was varied between 80° C. and 25° C. Results are shown in Table III as follows:

TABLE III

| Vol. of treated 1 WW (ml.) | Final Vol. (ml.) | Sulfate Concn. (M) | Digestion Time, 80° C. (min.) | Lead Concn. (M) | Stirring Time after Lead Add. (min.) | Final pH | Percent of Orig. Sr in Aq. |
|---|---|---|---|---|---|---|---|
| 100 | 199 | 1.0 | 60, 80° C. | 0.02 | 1 | 1.0 | 1.0 |
| 100 | 199 | 1.0 | 60, 60° C. | 0.02 | 1 | 1.0 | 16 |
| 100 | 199 | 1.0 | 60, 40° C. | 0.02 | 1 | 1.0 | 38 |
| 100 | 199 | 1.0 | 60, 25° C. | 0.02 | 1 | 1.0 | 60 |

The above table shows that the digestion temperature of 80° C. is a critical value.

It will be understood that the invention is not to be limited to the details given herein but that it may be modified wihin the scope of the appended claims.

The embodiments of the invention in which an exclusive property or privilege is claimed are defined as follows:

1. A method of recovering millimolar strontium values from a nuclear reactor fuel reprocessing waste solution having molarities of about 0.6 in $Na^+$, about 0.5 in Fe(III), about 0.1 in Al(III), about 0.01 in Ni(II), Cr(III) and R.E. (III), about 0.002 in Sr(II), about 4.0 in $H^+$ and about 1.0 in $SO_4^{-2}$, comprising: diluting the solution with $H_2O$ to make a dilution factor greater than 2.5, adding sodium carbonate to bring the pH of the solution within the range of 0.5 to 2.0, adding sulfate ion from the group consisting of sodium sulfate and sodium bisulfate to the solution to make a concentration of about 1 molar, digesting the solution at about 80° C. for from about 15 to 60 minutes, adding lead sulfate to make a precipitate of lead and strontium sulfates, and separating the precipitate from the solution.

2. A method of recovering millimolar strontium values from a nuclear reactor fuel reprocessing waste solution, comprising: diluting the solution with $H_2O$ to make a dilution factor greater than 2.5, adding sodium carbonate to bring the pH of the solution within the range of 0.5 to 2.0, adding sulfate ion from the group consisting of sodium sulfate and sodium bisulfate to the solution to make a concentration of about 1 molar, digesting the solution at about 80° C. for from about 15 to 60 minutes, adding lead nitrate to make a concentration of about 0.02 molar to make a precipitate of lead and strontium sulfates, and separating the precipitate from the solution.

3. A method of recovering millimolar strontium values from a nuclear reactor fuel reprocessing waste solution, comprising: adding sodium carbonate to bring the pH of the solution within the range of 0.5 to 2.0, adding sulfate ion from the group consisting of sodium sulfate and sodium bisulfate to the solution to make a concentration of about 1 molar, adding water to said solution to dilute said solution sufficiently to suppress the precipitation of Fe(III) present in said waste solution, digesting the solution at about 80° C. for from about 15 to 60 minutes, adding lead nitrate to make a concentration of about 0.02 molar to make a precipitate of lead and strontium sulfates, and separating the precipitate from the solution.

References Cited
UNITED STATES PATENTS 3,173,757  3/1965  Wheelwright et al. ____ 23—23 X EARL C. THOMAS, *Primary Examiner.*